(12) United States Patent
Ouellette et al.

(10) Patent No.: US 8,887,408 B2
(45) Date of Patent: Nov. 18, 2014

(54) APPARATUS FOR CONFIRMING RIGHT ANGLES AT CORNERS OF A RECTANGULAR STRUCTURE WITH A TAPE MEASURE

(71) Applicant: Ouellette Machinery Systems, Inc., Fenton, MO (US)

(72) Inventors: Joseph F. Ouellette, Glendale, MO (US); Richard J. Ouellette, Fenton, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 191 days.

(21) Appl. No.: 13/739,364

(22) Filed: Jan. 11, 2013

(65) Prior Publication Data
US 2014/0196299 A1    Jul. 17, 2014

(51) Int. Cl.
*G01B 3/10* (2006.01)
*G01B 3/56* (2006.01)

(52) U.S. Cl.
CPC ............... *G01B 3/1084* (2013.01); *G01B 3/56* (2013.01); *G01B 2003/1092* (2013.01)
USPC .............................................. 33/758; 33/760

(58) Field of Classification Search
CPC .. G01B 3/1041; G01B 3/1056; G01B 3/1071; G01B 3/1084; G01B 2003/1076
USPC ............................ 33/757, 758, 759, 760, 769
See application file for complete search history.

(56) References Cited

U.S. PATENT DOCUMENTS

| | | | | |
|---|---|---|---|---|
| 3,678,583 A | * | 7/1972 | Gundersen | 33/711 |
| 4,575,943 A | * | 3/1986 | Baum, Jr. | 33/759 |
| 5,481,810 A | * | 1/1996 | Hastings et al. | 33/760 |
| 5,894,675 A | * | 4/1999 | Cericola | 33/760 |
| 6,223,446 B1 | * | 5/2001 | Potter | 33/764 |
| 6,553,631 B1 | * | 4/2003 | Douglas | 24/3.12 |
| 7,730,631 B2 | * | 6/2010 | Delaurier | 33/759 |
| 2009/0139106 A1 | * | 6/2009 | Delaurier | 33/701 |
| 2012/0073152 A1 | * | 3/2012 | McGahan | 33/760 |
| 2012/0198717 A1 | * | 8/2012 | Sherman | 33/760 |

* cited by examiner

*Primary Examiner* — G. Bradley Bennett
(74) *Attorney, Agent, or Firm* — Joseph M. Rolnicki; Evans & Dixon, LLC (57) ABSTRACT

An apparatus and its method of use with a conventional tape measure confirms right angles of the corners of a rectangular structure. The apparatus is a two-part tool including a tape measure tab part and a tape measure tape part. The tab part secures a tape measure tab at one corner of the rectangular structure as the tape measure tape is pulled from the tape measure housing diagonally across the structure. The tape part of the apparatus is secured to the diagonally opposite corner of the structure and is used to check the diagonal distance measurement of the tape across the structure. The process is then again performed between the other diagonally opposite corners of the structure to obtain a diagonal distance measurement across the other corners to determine if the two diagonal measurements match and confirm the right angles of the rectangular structure.

20 Claims, 5 Drawing Sheets

APPARATUS FOR CONFIRMING RIGHT ANGLES AT CORNERS OF A RECTANGULAR STRUCTURE WITH A TAPE MEASURE

BACKGROUND OF THE INVENTION

1. Field of the Invention

The present invention pertains to an apparatus and its method of use in confirming right angles of the corners of a rectangular structure by using the apparatus with a conventional tape measure. The type of tape measure referred to basically comprises a housing containing a coiled tape and a tab on an end of the tape that is pulled to pull the tape from the housing. More specifically, the present invention pertains to a two part tool including a tape measure tab part and a tape measure tape part, and their method of use. The tab part secures a tape measure tab at one corner of a rectangular structure as the tape measure tape is pulled from the tape measure housing diagonally across the structure. The tape part of the apparatus is secured to the diagonally opposite corner of the structure and is used to check the diagonal distance measurement of the tape across the structure. The process is then again performed between the other corners of the structure to obtain a diagonal distance measurement across the other corners to determine if the two diagonal measurements match and confirm the right angles of the rectangular structure.

2. Description of the Related Art

There is a well known method of using a tape measure to determine whether the corners of a rectangular structure, for example a rectangular frame or a rectangular panel are right angles. The method basically involves measuring the diagonal distance between a first pair of diagonally opposite corners of the structure and then measuring the diagonal distance between the second pair of diagonally opposite corners of the structure and determining if these two measurements are the same. If the measurements are the same, the right angles of the four corners of the structure are confirmed.

This well known method of confirming that the corners of a rectangular structure are right angles is often performed with a tape measure. However, it is often difficult for a single person to perform the method. This is particularly true on larger rectangular structures where the person making the tape measure measurements cannot reach from one corner of the structure diagonally across to the opposite corner of the structure. In such situations, it is often necessary for the person using the tape measure to hook the tab at the end of the tape measure tape over one corner of the structure, and then extend the tape measure tape to the diagonally opposite corner of the structure to measure the diagonal distance between the corners. This method of measuring the diagonal distance between corners of a rectangular structure is disadvantaged in that often the tab at the end of the tape will slip off the engaged corner as the tape measure tape is extended to the diagonally opposite corner.

SUMMARY OF THE INVENTION

The above described problem involved in confirming right angles of a rectangular structure by using a tape measure to measure the distance between diagonally opposite corners of the structure is overcome by the apparatus of the invention and its method of use.

The apparatus of the invention is basically a two part tool that includes a tab part that is used with the tab at the end of the tape of a conventional tape measure, and a tape part that is used with the tape of the conventional tape measure. Basically, the tab part is secured to one corner of the rectangular structure and holds the tape measure tab while the tape is extended from the tape measure housing to the diagonally opposite corner of the rectangular structure. The tape part of the tool is secured to the diagonally opposite corner of the structure and provides an accurate determination of the distance measurement across the rectangular structure between the diagonally opposite corners.

The tab part of the apparatus has a general triangular configuration with opposite top and bottom surfaces. A magnet is contained in the tab part between the top and bottom surfaces.

First and second blocks project outwardly from the bottom surface of the tab part. The blocks are oriented at a right angle on the bottom surface. The blocks have respective first and second surfaces that oppose each other. The first and second side surfaces define a right angle between the surfaces.

A cylindrical post projects outwardly from the tab part top surface. The post is rotatable on the tab part about a rotation axis. The rotation axis is positioned where it intersects the apex of the right angle formed by the first and second surfaces of the respective first and second blocks on the tab part bottom surface. A notch is formed in a top surface of the post. The notch is dimensioned to receive the tape measure tab inserted in the notch.

The tape part of the apparatus has a similar construction to that of the tab part. The tape part also has a general triangular configuration with opposite top and bottom surfaces. A magnet is contained in the tape part between the top and bottom surfaces First and second blocks project outwardly from the tape part bottom surface. The first and second blocks are oriented at a right angle on the tape part bottom surface. The blocks have respective first and second surfaces that oppose each other. The first and second side surfaces define a right angle between the surfaces.

A tape post projects outwardly from the tape part top surface. Like the post of the tab part, the tape post is rotatable about a rotation axis and is positioned on the tape part top surface directly opposite the apex of the right angle formed by the first and second side surfaces of the blocks on the tape part bottom surface. The tape part post has a recessed, curved surface formed in the top of the post. The curved surface is dimensioned to receive the tape of a tape measure on the surface. A pair of indicator grooves are formed in the tape post top surface on opposite sides of the curved surface. The pair of indicator grooves are on a line that intersects the tape post rotation axis.

The method of using the apparatus to confirm the right angles of the corners of a rectangular structure with a tape measure first involves positioning the tab part and the tape part of the apparatus over first and second diagonally opposite corners of the structure. For example, the tab part of the apparatus is positioned over a first corner of the structure with the bottom surface of the tab part engaging over the corner and the block side surfaces of the tab part engaging against opposite sides of the corner of the structure. The tape part is then positioned over the diagonally opposite second corner of the structure with the bottom surface of the tape part engaging over the corner and the side surfaces of the tape part engaging against the opposite sides of the corner of the structure. When the structure is constructed of metal, the magnets in the two parts of the apparatus hold them to the corners of the structure. When the apparatus is used on a structure of non-ferris material the magnets can be replaced with suction cups, clamps or other equivalent devices.

The tab of the tape measure is then positioned in the notch in the tab part post. The tape of the tape measure is extended from the tape measure housing across the rectangular structure to the tape part at the diagonally opposite corner of the structure. The tape of the tape measure is then positioned over the tape part adjacent the indicator on the tape part post and a distance measurement diagonally across the rectangular structure is determined from observing the measurement on the tape measure tape adjacent the indicator.

The tab part and the tape part are then moved to the other diagonally opposite corners of the rectangular structure and the measurement method is repeated. The two diagonal distance measurements are then compared to confirm the right angles of the rectangular structure.

DESCRIPTION OF THE DRAWINGS

Further features of the apparatus and method of the invention are set forth in the following detailed description of the apparatus and method and in the drawing figures.

DETAILED DESCRIPTION

As stated earlier, the apparatus of the invention 10 is basically a two part tool comprising a tab part 12 that is used with the tab at the end of the tape of a conventional tape measure, and a tape part 14 that is used with the tape of the conventional tape measure. In the example of the apparatus 10 to be described, both the tab part 12 and the tape part 14 are constructed of metal. This gives the two parts of the apparatus sufficient strength to be used in confirming right angles at corners of a rectangular structure constructed of metal. Other embodiments of the apparatus 10 could be constructed of other materials.

Figure 1:
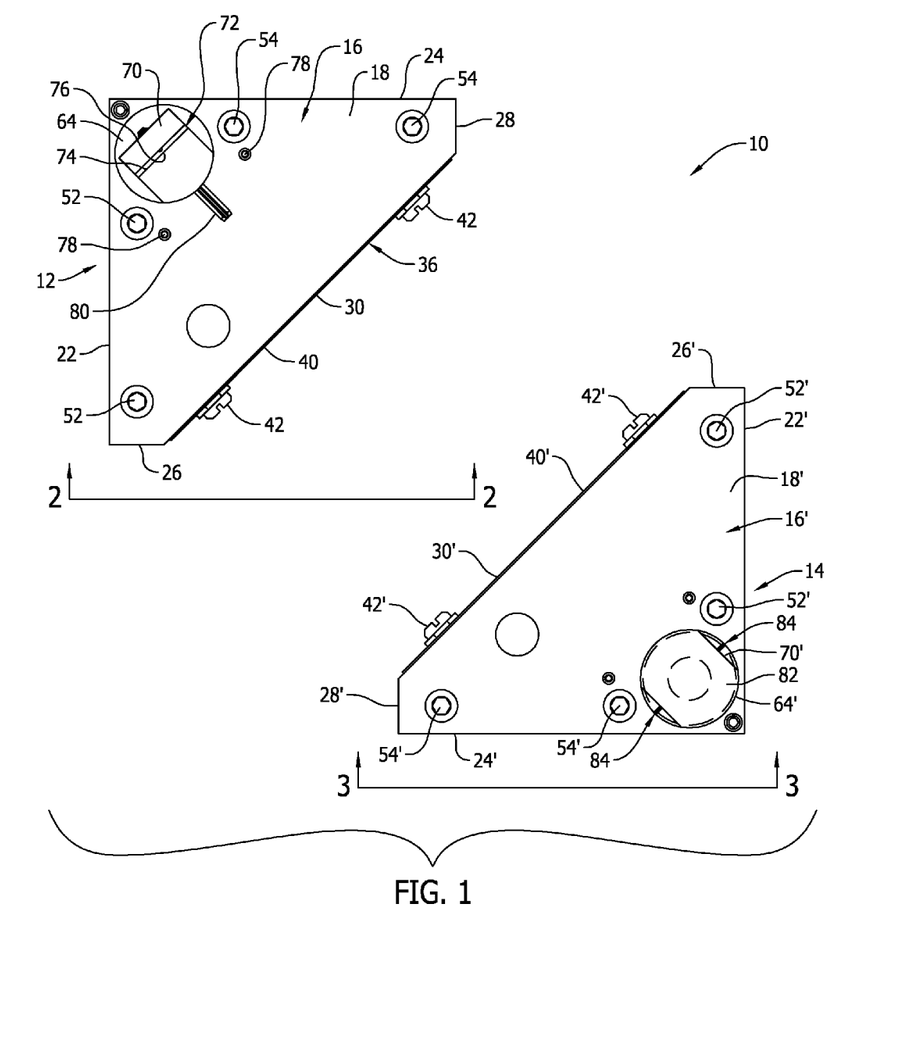
FIG. 1 is a plan view of the tab part and the tape part of the apparatus.
Figure 2:
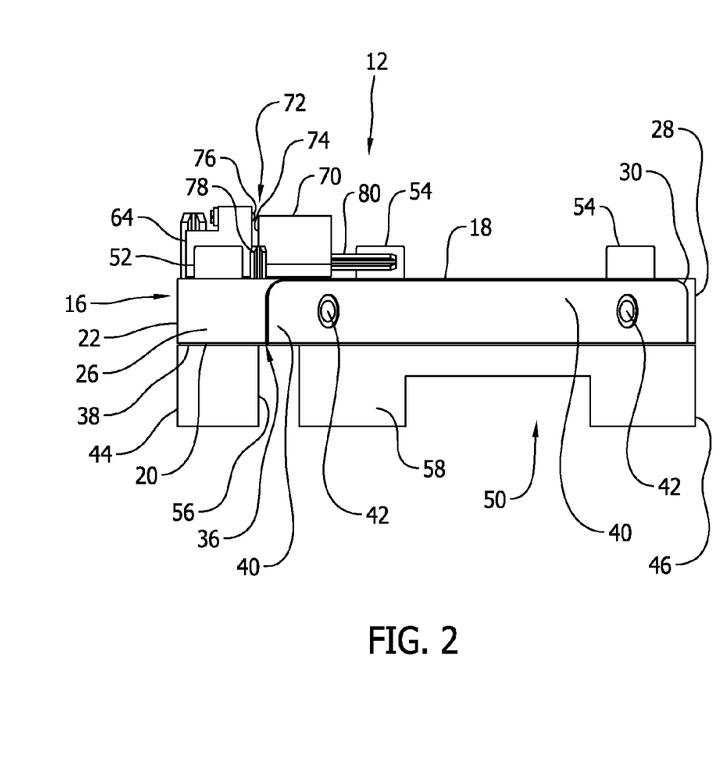
FIG. 2 is a side elevation view of one side of the tab part from along the line 2-2 in FIG. 1.
Figure 3:
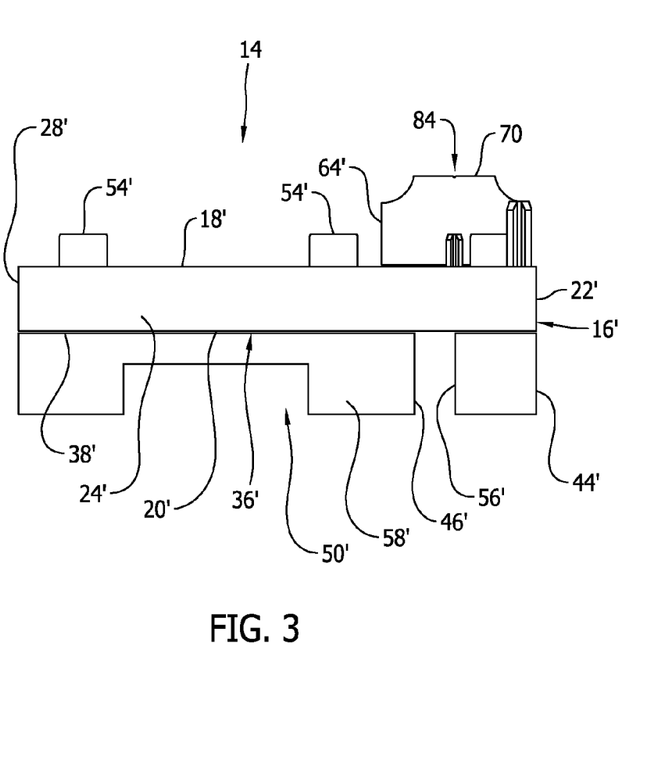
FIG. 3 is a side elevation view of one side of the tape part from along the line 3-3 in FIG. 1.
Figure 4:
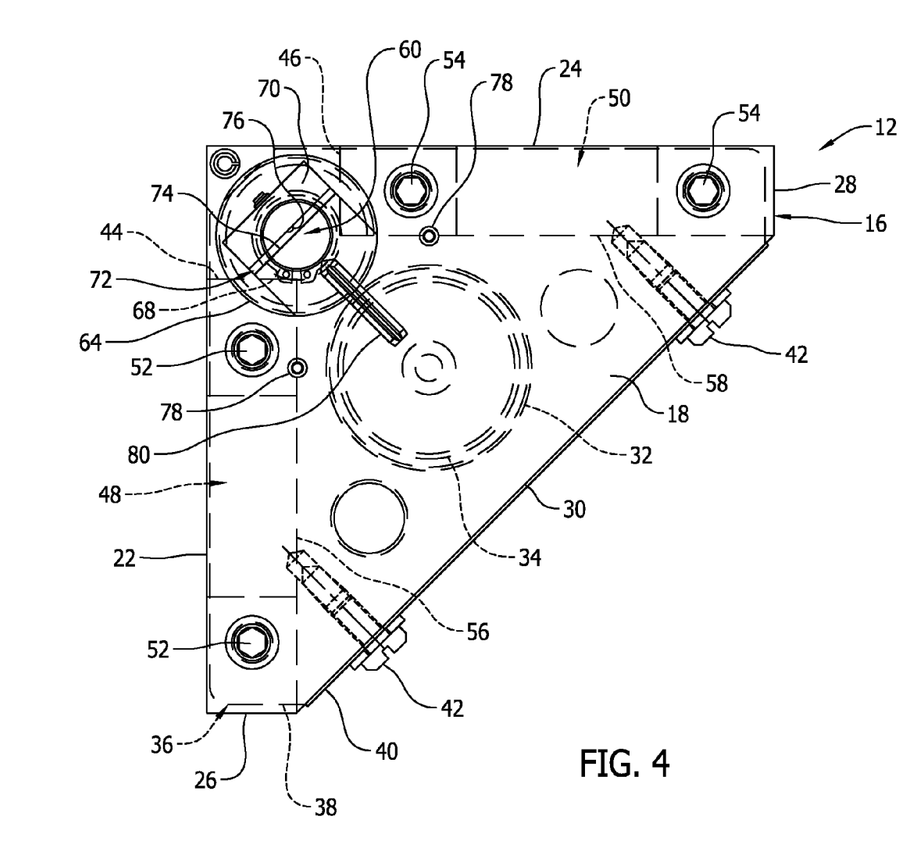
FIG. 4 is a view of the tab part similar to FIG. 1, but also shows internal features in dashed lines.

As shown in FIGS. 1 and 4, the tab part 12 of the apparatus 10 includes a base 16 having a general triangular configuration with opposite top 18 and bottom 20 surfaces. The top 18 and bottom 20 surfaces are flat, parallel surfaces. The base 16 has two intersecting side surfaces 22, 24 that are oriented at a right angle to each other. The intersecting side surfaces 22, 24 have substantially the same length. The base also has a couple of shorter side surfaces 26, 28 and a longer side surface 30 that extends between the shorter side surfaces. The side surfaces of the base 16 give the base its general triangular configuration. However, it is not necessary that the base 16 have the triangular configuration shown in FIGS. 1 and 4 for proper functioning of the tab part 12.

Figure 6:
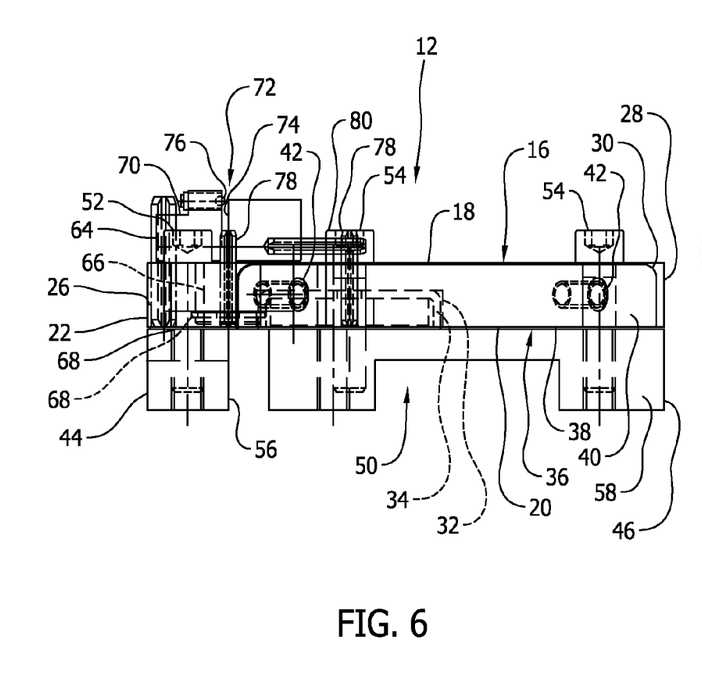
FIG. 6 is a view of the side of the tab part similar to FIG. 2, but also shows internal features in dashed lines.

As shown in FIGS. 4 and 6, a cylindrical hole 32 is formed in the base bottom surface 20. The hole 32 extends upwardly through the bottom surface 20 and into the base 16, but does not extend completely through the base. The hole 32 is located in a central area of the tab part base 16.

A cylindrical magnet 34 is positioned in the hole 32 in the base bottom surface 20. The magnet 34 is dimensioned to occupy much of the interior volume of the hole 32 in the base.

Referring to FIGS. 1, 2, 4 and 6, a plate 36 is secured to the tab part 16. The plate 36 has a triangular portion 38 that extends over the base bottom surface 20 and the hole 32 in the bottom surface and secures the magnet 34 in the hole. The configuration of the plate triangular portion 38 closely follows the triangular configuration of the base bottom surface 20. The plate 36 also has an elongate flange 40 that is oriented at a right angle to the plate triangular portion 38. The flange 40 extends across the longer side surface 30 of the base 16 and is secured to the side surface by a pair of threaded fasteners 42.

A pair of the elongate blocks 44, 46 are secured to the base bottom surface 20 along the intersecting side surfaces 22, 24 of the base. Each of the elongate blocks 44, 46 has a rectangular configuration except for a notch 48, 50 formed in a bottom surface of each block. The opposite top surface of each block 44, 46 is positioned against the plate triangular portion 38 on the base bottom surface 20 and the blocks 44, 46 are secured to the base bottom surface 20 by pairs of threaded fasteners 52, 54. The fasteners 52, 54 and their respective blocks 44, 46 thereby further secure the plate 36 to the tab part base 16. The blocks 44, 46 have flat interior surfaces 56, 58 that oppose each other. The interior surfaces 56, 58 define a right angle between the surfaces having an apex 60. Coplanar straight lines projected across the block interior surfaces 56, 58 intersect at the apex point 60 shown in FIG. 4.

Figure 7:
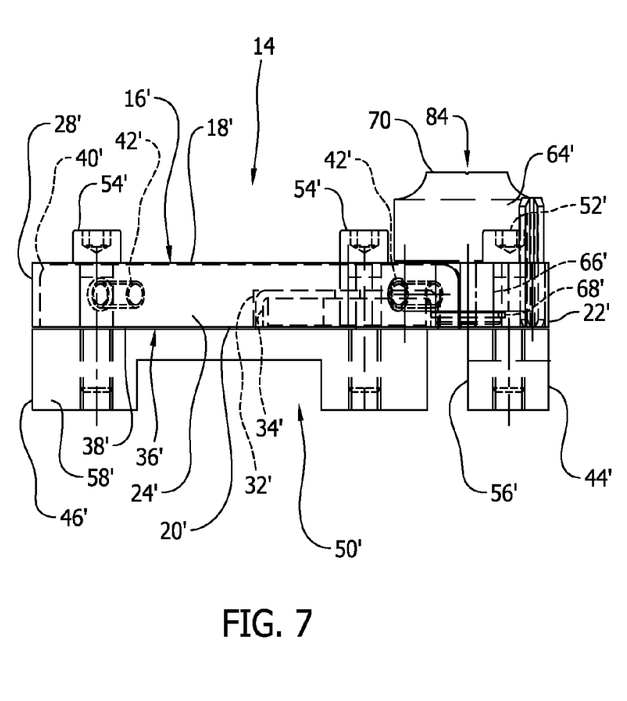
FIG. 7 is a view of the side of the tape part similar to FIG. 3, but also shows internal features in dashed lines.

Referring to FIGS. 1, 2, 4 and 6, a cylindrical tab post 64 projects outwardly from the base top surface 18. As shown in FIG. 7, the tab post 64 is mounted for rotation on the base top surface 18 by a stub shaft 66 that extends downwardly through a hole formed in the base top surface. The stub shaft 66 extends through a smaller diameter portion of the hole to a larger diameter portion of the hole. A retaining ring 68 mounted on the stub shaft 66 in the larger internal diameter portion of the hole secures the tab post 64 to the base top surface 18. The tab post 64 is rotatable on the base top surface 18 about a rotation axis that intersects the apex 60 of the angle formed between the block interior surfaces 56, 58 on the bottom surface 20 of the base. Referring to FIGS. 1, 2, 4 and 6, the tab post 64 projects outwardly from the base top surface 18 to a top surface 70 of the post. A notch or groove 72 is formed in the post top surface. The notch 72 has an edge 74 that is positioned in a plane that intersects the axis of rotation of the tab post 64 and the apex 60 of the right angle formed by the first and second blocks 44, 46 on the base bottom surface 20. The notch 72 is dimensioned to receive a tape measure tab inserted in the notch. A spring biased detent 76 is provided on the tab post 64 on the opposite side of the notch 72 from the notch edge surface 74. When a tape measure tab is inserted in the notch 72 the tab compresses the spring of the detent 76 and the spring force exerted on the detent holds the tab against the edge surface 74 and in the notch 72.

A pair of studs 78 are inserted into holes in the base top surface 18 and project outwardly from the top surface. The studs 78 are positioned equal distances from the tab post 64 and are directly above the interior surfaces 56, 58 of the first 44 and second 46 blocks secured to the base bottom surface 20. A pin 80 is inserted into a hole formed in the side of the tab post 64. The pin 80 projects outwardly from the tab post parallel over the base top surface 18. The pin 80 has a center axis that intersects the tab post 64 axis of rotation. The pin 80 projects a sufficient distance from the tab post 64 to engage with one of the pair of studs 78 when the tab post 64 is rotated in opposite directions on the tab part base 16. Thus, the pair of studs 78 limit the rotation of the tab post 64 to a 90° arc.

The tape part 14 has a construction that, for the most part, is the same as that of the tab part 12. Therefore, the construction of the tape part 14 that is the same as the tab part 12 will not be described in detail, and the component parts of the tape part 14 that are the same as those of the tab part 12 will be labeled with the same reference numbers employed in the description of the tab part 12 with the reference numbers being followed by a prime (').

Figure 5:
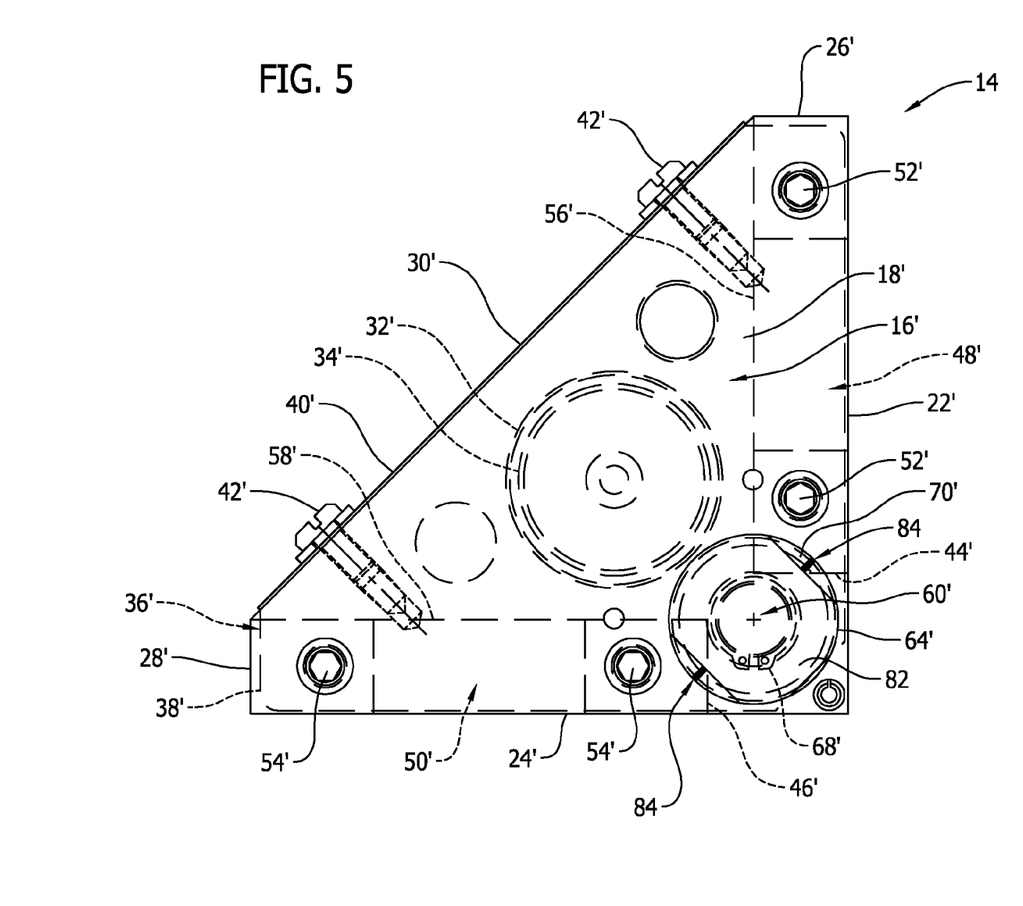
FIG. 5 is a view of the tape part similar to FIG. 1, but also shows internal features in dashed lines.

Referring to FIGS. 1, 3, 5 and 7, the tape part 14 also has a base 16' with a general triangular configuration and flat, parallel top 18' and bottom 20' surfaces. The tape part base 16' also has a pair of intersecting side surfaces 22', 24', a pair of shorter side surfaces 26', 28' and a longer side surface 30'. As shown in FIGS. 5 and 7, a cylindrical hole 32' extends into the tape part bottom surface 20' and a cylindrical magnet 34' is positioned in the hole.

Referring to FIGS. 1, 3, 5 and 7, a plate 36' is secured to the tape part bottom surface 20' with a triangular portion 38' of the plate extending over the bottom surface 20' and securing the magnet 34' in the hole 32', and with a flange 40' of the plate extending over the longer side surface 30' of the base. A pair of fasteners 42' secure the flange 40' to the longer side surface 30' of the base 16'.

First 44' and second 46' elongate blocks are secured to the base bottom surface 20'. Just as with the tab part 12, the blocks 44', 46' have notches 48', 50' in their bottom surfaces and are secured to the tape part base 16' by a pair of fasteners 52', 54'. The blocks 44', 46' also function to secure the plate 36' to the base bottom surface 20'. Interior surfaces 56', 58' of the first 44' and second 46' blocks define a right angle between the surfaces. Straight, coplanar lines extended across the surfaces 56', 58' intersect at an apex point 60' shown in FIG. 5.

Referring to FIGS. 1, 3, 5 and 7, the tape part 14 also includes a cylindrical tape post 64' that is mounted for rotation on the top surface 18' of the tape part base 16'. As shown in FIG. 7, the tape post 64' has a stub shaft 66' that is inserted into a hole formed in the base top surface 18' and is secured in the hole by a retainer ring 68'. The tape post 64' projects outwardly from the top surface 18' of the tape part base 16' to a top surface 70' of the post.

The tape part 14 of the apparatus differs from the tab part 12 in the construction of the top surface 70' of the tape post 64'. The tape post top surface 70' is formed with a recessed curved surface 82. The curved surface 82 at the top of the tape post 54' is dimensioned to match the cross-section curvature of the tape of a conventional tape measure. A pair of collinear indicator grooves 84 are formed in the tape post top surface 70' on opposite sides of the curved surface 82. A straight line extending through the pair of indicator grooves 84 intersects the axis of rotation of the tape post 64' and the apex 60' of the right angle defined by the interior surfaces 56', 58' of the first 44' and second 46' blocks on the bottom surface of the tape part base 16'.

The method of using the apparatus 10 to confirm the right angles of the corners of a rectangular structure with a tape measure first involves positioning the tab part 12 and the tape part 14 of the apparatus over first and second diagonally opposite corners of the structure. For example, the tab part 12 of the apparatus is positioned over a first corner of the structure with the bottom surface 20 of the tab part 12 engaging over the corner and the interior surfaces 56, 58 of the first 44 and second 46 blocks of the tab part 12 engaging against opposite sides of the corner of the structure. This positions the edge surface 74 on the tab part post 64 directly over the apex of the structure first corner. The tape part 14 is then positioned over the diagonally opposite corner of the structure with the bottom surface 20' of the tape part engaging over the corner and the interior surfaces 56', 58' of the first 44' and second 46' blocks on the tape part bottom surface 20' engaging against the opposite sides of the second corner of the structure. This positions the line between the indicator grooves 84 on the tape part post 64' directly over the apex of the structure second corner. When the structure is constructed of metal, the magnets 34, 34' in the respective tab part 12 and tape part 14 hold them to the corners of the structure. In use with non-ferris materials, the magnets could be replaced with suction cups, clamps or other equivalent devices.

The tab of the tape measure is then positioned in the notch 72 in the top surface 70 of the tab part post 64. The detent 76 urges the tab part of the tape measure against the edge surface 74 of the notch and securely holds the tab of the tape measure in the notch 72. The tape of the tape measure is then extended from the tape measure housing across the structure to the tape part 14 of the apparatus at the diagonally opposite second corner of the structure. The ability of the tab part post 64 to rotate assists in securing the tape measure tab in the post notch 72 as the tape measure is moved to the second corner. The tape of the tape measure is then positioned over the recessed curved surface 82 in the top of the tape part post 64'. A distance measurement diagonally across the rectangular structure from the first corner apex to the second corner apex is determined from observing the measurement on the tape measure tape between the indicator grooves 84 on the tape part post 64'.

The tab part 12 and the tape part 14 are then moved to the other diagonally opposite third and fourth corners of the rectangular structure and the measurement method described above is repeated. The two diagonal distance measurements between the first and second corners and the third and fourth corners of the structure are then compared to see if they are equal and to thereby confirm the right angles at the corners of the rectangular structure.

As various modifications could be made in the construction of the invention herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed:

1. An apparatus for confirming right angles at corners of a rectangular structure with a tape measure, the apparatus comprising:
   a tab part having opposite top and bottom surfaces;
   a first side surface projecting outwardly from the tab part bottom surface;
   a second side surface projecting outwardly from the tab part bottom surface, the first and second side surfaces being relatively positioned defining an angle between the first and second side surfaces;
   an edge surface projecting outwardly from the tab part top surface, the edge surface being dimensioned to be engaged by a tab of a tape measure;
   a tape part that is separate from the tab part, the tape part having opposite top and bottom surfaces;
   a first side surface projecting outwardly from the tape part bottom surface;
   a second side surface projecting outwardly from the tape part bottom surface, the first and second side surfaces being relatively positioned defining an angle between the first and second side surfaces; and
   an indicator on the tape part top surface, the indicator being positioned to align with a tape of a tape measure when a tab of the tape measure is engaged against the edge surface of the tape part and the tape of the tape measure is extended from the tab part and across the top surface of the tape part and is positioned adjacent the indicator, whereby the indicator aligning with the side of the tape indicates a distance measurement on the tape between the edge surface of the tab part and the indicator of the tape part.

2. The apparatus of claim 1, further comprising:
the angle defined between the first and second side surfaces of the tab part being a right angle; and,
the angle defined between the first and second side surfaces of the tape part being a right angle.

3. The apparatus of claim 2, further comprising:
the tab part bottom surface being substantially flat and perpendicular to the first and second side surfaces of the tab part; and
the tape part bottom surface being substantially flat and perpendicular to the first and second side surfaces of the tape part.

4. The apparatus of claim 1, further comprising:
the first and second side surfaces of the tab part being relatively positioned where first and second lines projected across the respective first and second side surfaces intersect at a point; and,
the edge surface of the tab part being coplanar with the point.

5. The apparatus of claim 4, further comprising:
the edge surface being rotatable about an axis on the tab part and the axis intersecting the point.

6. The apparatus of claim 1, further comprising:
the indicator being one of two indicators on the tape part top surface, the two indicators being spaced apart by a distance that enables a width of the tape of the tape measure to be positioned between the two indicators.

7. The apparatus of claim 1, further comprising:
a magnet on the tab part.

8. The apparatus of claim 7, further comprising:
a magnet on the tape part.

9. An apparatus for confirming right angles at corners of a rectangular structure with a tape measure, the apparatus comprising:
a tab part having opposite top and bottom surfaces, the bottom surface being substantially flat;
a first block on the tab part bottom surface, the first block having a first side surface that is substantially flat and projects outwardly at a right angle from the tab part bottom surface;
a second block on the tab part bottom surface, the second block having a second side surface that is substantially flat and projects outwardly at a right angle from the tab part bottom surface;
the first and second side surfaces being relatively positioned defining a right angle between the first and second side surfaces;
a tab post on the tab part top surface, the tab post having an edge surface that is positioned at an angle relative to the tab part top surface;
a tape part that is separate from the tab part, the tape part having opposite top and bottom surfaces, the tape part bottom surface being substantially flat;
a first block on the tape part bottom surface, the first block having a first side surface that is substantially flat and projects outwardly at a right angle from the tape part bottom surface;
a second block on the tape part bottom surface, the second block having a second side surface that is substantially flat and projects outwardly at a right angle from the tape part bottom surface;
the first and second side surfaces of the tape part being relatively positioned defining a right angle between the first and second side surfaces;
a tape post on the tape part top surface, the tape post having an indicator on the tape post, the indicator being positioned to align with a side of a tape of a tape measure when a tab of the tape measure is engaged against the edge surface of the tab post and the tape of the tape measure is extended from the tab post across the tape part top surface and is positioned adjacent the indicator, whereby the indicator aligning with the side of the tape indicates a measurement of a distance between the edge surface of the tab post and the indicator on the tape post.

10. The apparatus of claim 9, further comprising:
the tab post projecting outwardly from the tab part top surface and positioning the edge surface outwardly from the tab part top surface.

11. The apparatus of claim 9, further comprising:
the tape post projecting outwardly from the tape part top surface and positioning the indicator outwardly from the tape part top surface.

12. The apparatus of claim 9, further comprising:
the tab post being mounted on the tab part for rotation of the tab post about an axis relative to the tab part.

13. The apparatus of claim 12, further comprising:
the first and second side surfaces of the tab part being relatively positioned where first and second coplanar straight lines projected across the respective first and second side surfaces intersect at a point; and
the tab post rotation axis intersecting the point.

14. The apparatus of claim 9, further comprising
the first and second side surfaces of the tab part being relatively positioned where first and second coplanar straight lines projected across the respective first and second side surfaces intersect at a point; and
the indicator on the tape post being positioned in a plane that intersects the point.

15. The apparatus of claim 9, further comprising:
the indicator being one of a pair of collinear indicators on the tape post, the pair of indicators being spaced apart by a distance that enables a width of the tape measure tape to be positioned between the pair of indicators.

16. The apparatus of claim 9, further comprising:
a magnet inside the tape part between the tape part top and bottom surfaces.

17. The apparatus of claim 16, further comprising:
a magnet inside the tape part between the tape part top and bottom surfaces.

18. A method of confirming right angles at corners of a rectangular structure with a tape measure, the method comprising:
providing a tab part having opposite top and bottom surfaces, first and second side surfaces that project outwardly from the tab part bottom surface and are oriented at an angle, and an edge surface that projects outwardly from the tab part top surface;
providing a tape part having opposite top and bottom surfaces, first and second side surfaces that project outwardly from the tape part bottom surface and are oriented at an angle, and an indicator on the tape part top surface;
positioning the tab part bottom surface over a first corner of the rectangular structure with the first and second side surfaces of the tab part engaging against the first corner of the rectangular structure;

positioning the tape part bottom surface over a second corner of the rectangular structure that is diagonally opposite the first corner with the first and second side surfaces of the tape part engaging against the second corner of the rectangular structure;

providing a tape measure having a tape extendible from the tape measure and a tab at an end of the tape;

positioning the tab of the tape measure against the tab part edge surface and extending the tape from the tape measure diagonally across the rectangular structure to the tape part;

positioning the tape of the tape measure adjacent the tape part indicator and determining a first distance measurement diagonally across the rectangular structure from the tab part edge surface to the tape part indicator;

removing the tab part from the first corner of the rectangular structure and positioning the tab part over a third corner of the rectangular structure with the first and second side surfaces of the tab part engaging against the third corner of the rectangular structure;

removing the tape part from the second corner of the rectangular structure and positioning the tape part over a fourth corner of the rectangular structure with the first and second side surfaces of the tape part engaging against the fourth corner of the rectangular structure;

positioning the tab of the tape measure against the tab part edge surface and extending the tape from the tape measure diagonally across the rectangular structure to the tape part;

positioning the tape of the tape measure adjacent the tape part indicator and determining a second distance measurement diagonally across the rectangular structure from the tab part edge surface to the tape part indicator;

comparing the first distance measurement with the second distance measurement to determine if the measurements are equal and thereby confirming right angles of the rectangular structure.

19. The method of claim 18, further comprising:

providing a rotatable post on the tab part with the edge surface on the rotatable post; and rotating the post on the tab part as the tape measure is extended from the tape measure diagonally across the rectangular structure to the tape part.

20. The method of claim 18, further comprising:

providing a magnet on the tab part; and providing a magnet on the tape part.

\* \* \* \* \*